Patented Sept. 14, 1954

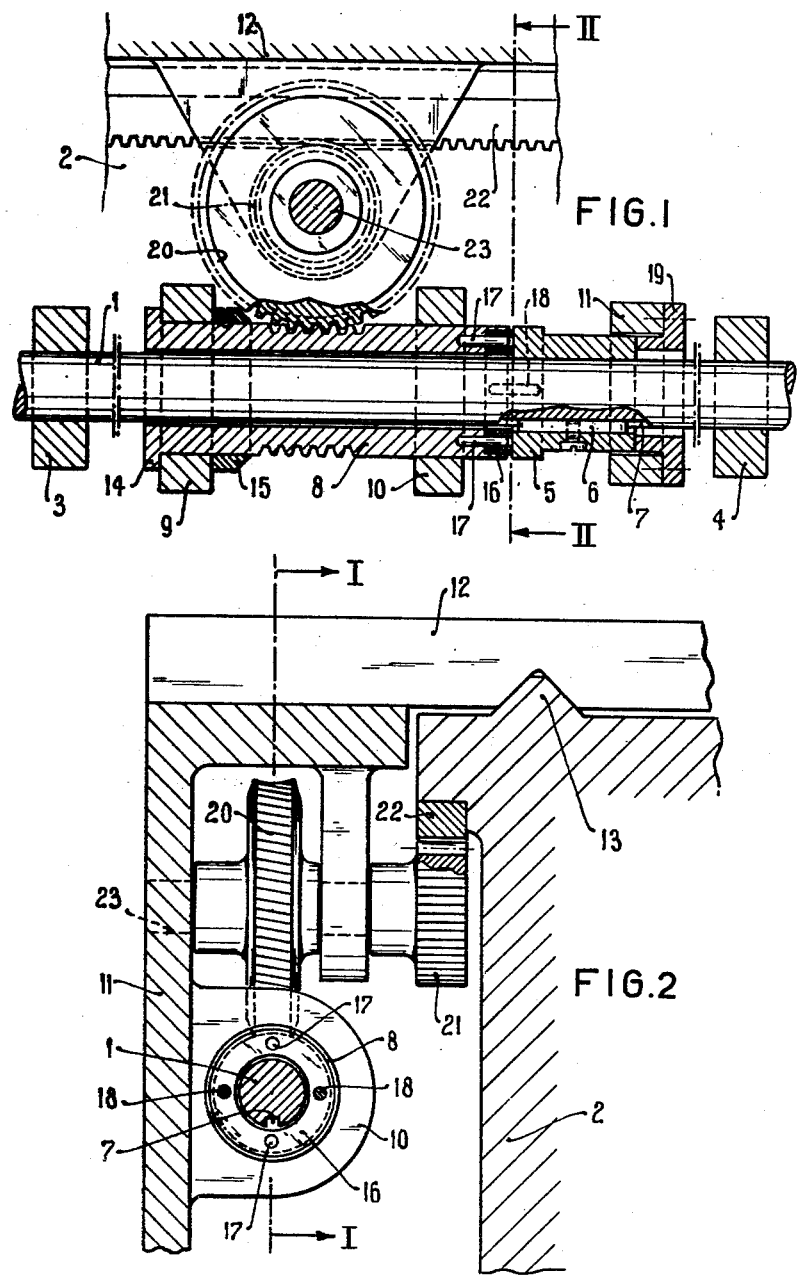

2,688,883

UNITED STATES PATENT OFFICE 2,688,883

FLEXIBLE CONNECTION FOR WORMS

Johan W. Schut, Soestdijk, Netherlands, assignor to N. V. Nederlandsche Machinefabriek "Artillerie-Inrichtingen," Zaandam, Netherlands, a company of the Netherlands Application April 6, 1953, Serial No. 346,984

Claims priority, application Netherlands April 9, 1952

3 Claims. (Cl. 74—425)

1

This invention relates to a gear drive transmission, wherein the driving shaft and the driven element are journalled independently of each other and said driven element is slidably mounted on the driving shaft. The gear drive transmission, according to the present invention, is particularly adapted for moving the slide of machine tools.

With drives of this type, the drive shaft not only transmits the driving torque to the driven element, when said latter element is keyed to the shaft, but the driven element also receives an unbalanced force from rotating with the shaft and, therefore, continuously changes its direction.

This unbalanced and variable force, together with the forces caused by the bending of the drive shaft, the inexactness of the bearings of the drive shaft and the slidable mounting of the driven element on the drive shaft, exert variable forces on the bearings of the driven element. With drives of certain machines, e. g. for machine tools, these forces acting on the bearings of the driven element are highly undesirable. Thus, with a lathe having a lead or feed shaft on which is mounted a sleeve provided with a worm for moving the slide, the varying forces exerted on the worm sleeve will continually change the position of the slide on the guideways of the base of the machine, or cause deformations of the slide whereby the quality of the surface of the machine work piece will be unfavorably influenced.

The invention has for its object to avoid the transmission of varying forces to the driven element and to this end the driven element freely surrounds the drive shaft with clearance therebetween and is connected by a flexible coupling to a sleeve slidably mounted on and keyed to the drive shaft, the coupling permitting radial and tangential movement of the sleeve with respect to the driven element and angular displacement of the axis of the sleeve with respect to the axis of the driven element. The coupling device may comprise a coupling having crossing grooves in combination with a universal joint or it may also comprise a spring coupling.

According to the preferred embodiment of the invention the coupling consists of a ring of rubber or similar resilient material arranged between the sleeve and the driven element, said ring being connected to the sleeve and to the driven element, respectively, by one or more pins.

This preferred embodiment, applied to the drive gear for moving the slide of a lathe, is illustrated in the accompanying drawing, in which:

Fig. 1 is a longitudinal sectional view of the drive taken on the line 1—1; and

Fig. 2, which shows a transverse sectional view taken on the line 2—2 of Fig. 1.

The feed lead or drive shaft 1 is supported at the front of the base 2 in bearings 3 and 4 which are secured to the base. Slidably mounted on shaft 1 is a sleeve 5 which is secured against rotation to the shaft by means of a key 6 fitted in a spline or keyway 7 in the shaft.

A worm sleeve 8 freely surrounding the drive shaft 1 with clearance therebetween is supported in bearings 9 and 10 carried by the front plate 11 depending from the machine slide 12 which freely runs on guides 13 of the machine base 2. The sleeve 8 is confined in the bearing 9 by means of a shoulder 14 and a locking ring 15. A rubber ring 16 is interposed between the sleeve 5 and the worm sleeve 8 and the rubber ring 16 is connected by means of two pins 17 to the sleeve 8 and by means of two pins 18 to sleeve 5. The sleeve 5 at one end thereof is confined in the front plate 11 of the slide of the lathe by a locking plate 19 rigidly secured to the front plate 11.

When the lead shaft 1 is rotated the torque of the driving sleeve 5, by means of the resilient ring 16, is transmitted to the worm sleeve 8, which through the intermediary of a helicoidally toothed wheel 20 drives pinion 21 which meshes with a gear rack 22 provided on the machine base 2 of the lathe. A shaft 23 which carries the toothed wheel 20 and the pinion 21 is journalled in the front plate 11 of the slide 12 so that the slide is displaced upon rotation of the lead shaft.

All the forces exerted on the bearings 9, 10 of the worm sleeve 8 which are mounted on the plate 11 of the slide, resulting from the asymmetrical drive by the lead shaft 1, from inexactness of the bearings of the lead shaft and the sleeve 8 and from the bending of the lead shaft, are now taken up in the rubber coupling ring 16 so that the forces have no influence on the slide of the lathe. By such an arrangement, therefore, the machined surface of the work piece will be as smooth as possible.

What I claim is:

1. A driving gear having a driving shaft and a driven element journalled independently of each other, said driven element surrounding the driving shaft with clearance so as to be slidable on the shaft, and a sleeve slidably mounted on the driving shaft but prevented from rotation with respect to the shaft, a coupling device connecting said sleeve with said driven element and allowing radial and tangential movement of the sleeve with respect to the driven element and angular displacement of the axis of the sleeve with respect to the axis of the driven element, said coupling device being mounted on said driving shaft between the sleeve and the driven element.

2. A driving gear as in claim 1, characterized in that the coupling device between the sleeve and the driven element, comprises a ring of rubber or similar resilient material connected to the sleeve by at least one pin and to the driven element also by at least one pin.

3. A drive for moving the slide of a machine tool comprising a lead shaft and a worm sleeve surrounding said shaft with clearance so as to be slidable on the shaft and being journalled independently of said shaft, and a sleeve slidably mounted on the lead shaft but prevented from rotation with respect to said shaft, a coupling device connecting said worm sleeve with said slidable sleeve and allowing radial and tangential movement of the latter sleeve with respect to the worm sleeve and angular displacement of the axis of the sleeve with respect to the axis of the worm sleeve, said coupling device being arranged on said lead shaft between said sleeves.

No references cited.